(12) United States Patent
Wright et al.

(10) Patent No.: US 7,857,970 B2
(45) Date of Patent: Dec. 28, 2010

(54) HEIGHT ADJUSTABLE CENTER TUBE AND GUIDE FOR A FILTER CARTRIDGE ASSEMBLY

(75) Inventors: Allen Buhr Wright, Hope Mills, NC (US); L. Steven Cline, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 1191 days.

(21) Appl. No.: 11/409,573

(22) Filed: Apr. 24, 2006

(65) Prior Publication Data

US 2007/0246417 A1    Oct. 25, 2007

(51) Int. Cl.
B01D 27/08    (2006.01)
(52) U.S. Cl. .................... 210/232; 210/457; 210/443; 210/444
(58) Field of Classification Search ............ 210/232, 210/457, 443, 444
See application file for complete search history.

(56) References Cited

U.S. PATENT DOCUMENTS 3,231,089 A * 1/1966 Thornton .................... 210/130
3,747,307 A * 7/1973 Peshina et al. ............... 55/379
5,423,984 A * 6/1995 Belden ........................ 210/232
6,511,101 B1 * 1/2003 Sommer et al. ............. 285/319

OTHER PUBLICATIONS

Most recently filed Reply, dated Jun. 1, 2010, for U.S. Appl. No. 11/410,122.
Most recently filed Reply, dated Jul. 1, 2010, for U.S. Appl. No. 11/612,205.

* cited by examiner

Primary Examiner—Thomas M Lithgow
(74) Attorney, Agent, or Firm—Crowell & Moring LLP

(57) ABSTRACT

A filter media includes a media pack having a central opening that extends between opposing ends of the media pack. A support member, such as a center tube, extends through the central opening and supports one of the opposing ends. A second support member, such as a filter cartridge assembly guide, is secured to the second support member and supports the other of the opposing ends. In one example, the center tube includes a seat that extends radially outwardly from an axially body of the center tube to support the media pack. The first and second support members are secured by an interlocking connection of any suitable configuration. The disclosed arrangement can be used to reduce the number of components required for providing a large number of filter cartridge assembly. Each of a plurality of media packs provide different heights. A first support member is selected to support one of the opposing ends. A second support member is selected to accommodate the height of the selected media pack. The first and second support members cooperate with one another to support the opposing ends of the media pack.

14 Claims, 4 Drawing Sheets

HEIGHT ADJUSTABLE CENTER TUBE AND GUIDE FOR A FILTER CARTRIDGE ASSEMBLY

BACKGROUND OF THE INVENTION

This invention relates to a center tube and guide for a filter that together form a height adjustable filter cartridge assembly. The assembly can be used, for example, in an oil filter.

A typical filter includes a filter cartridge assembly having a media pack. The media pack typically comprises a filter media arranged between opposing end discs. A center tube is arranged between the end discs within a central opening provided by the filter media to prevent the filter media from collapsing as fluid flows from an inlet side of the filter media toward the central opening to an outlet side. A guide is separately arranged between one of the end discs and the filter housing.

There are numerous configurations of fluid filters, which require media packs of different heights, for example, between 3.5-6 inches. As a result, many different center tubes providing differing heights are required to accommodate different media pack heights. Accordingly, a large inventory of center tubes are required, which is costly and can create complications during the manufacturing stage. What is needed is an improved filter cartridge assembly that can accommodate media packs of different heights.

SUMMARY OF THE INVENTION

A filter media includes a media pack having a central opening that extends between opposing ends of the media pack. A support member, such as a center tube, extends through the central opening and supports one of the opposing ends. A second support member, such as a filter cartridge assembly guide, is secured to the second support member and supports the other of the opposing ends. In one example, the center tube includes a seat that extends radially outwardly from an axially body of the center tube to support the media pack. The first and second support members are secured by an interlocking connection of any suitable configuration.

The disclosed arrangement can be used to reduce the number of components required for providing a large number of filter cartridge assemblies. Each of a plurality of media packs provide different heights. A first support member is selected to support one of the opposing ends. A second support member is selected to accommodate the height of the selected media pack. The first and second support members cooperate with one another to support the opposing ends of the media pack.

The filter is assembled by inserting the center tube into the central opening so that the seat of the center tube supports one end of the media pack. The guide is secured to the center tube with the interlocking connection to support the other end of the media pack. In the example shown, seals are arranged between the guide and center tube and a pocket pleated filter media to provide the filter cartridge assembly.

These and other features of the present invention can be best understood from the following specification and drawings, the following of which is a brief description.

DETAILED DESCRIPTION OF THE PREFERRED EMBODIMENT

Figure 1:
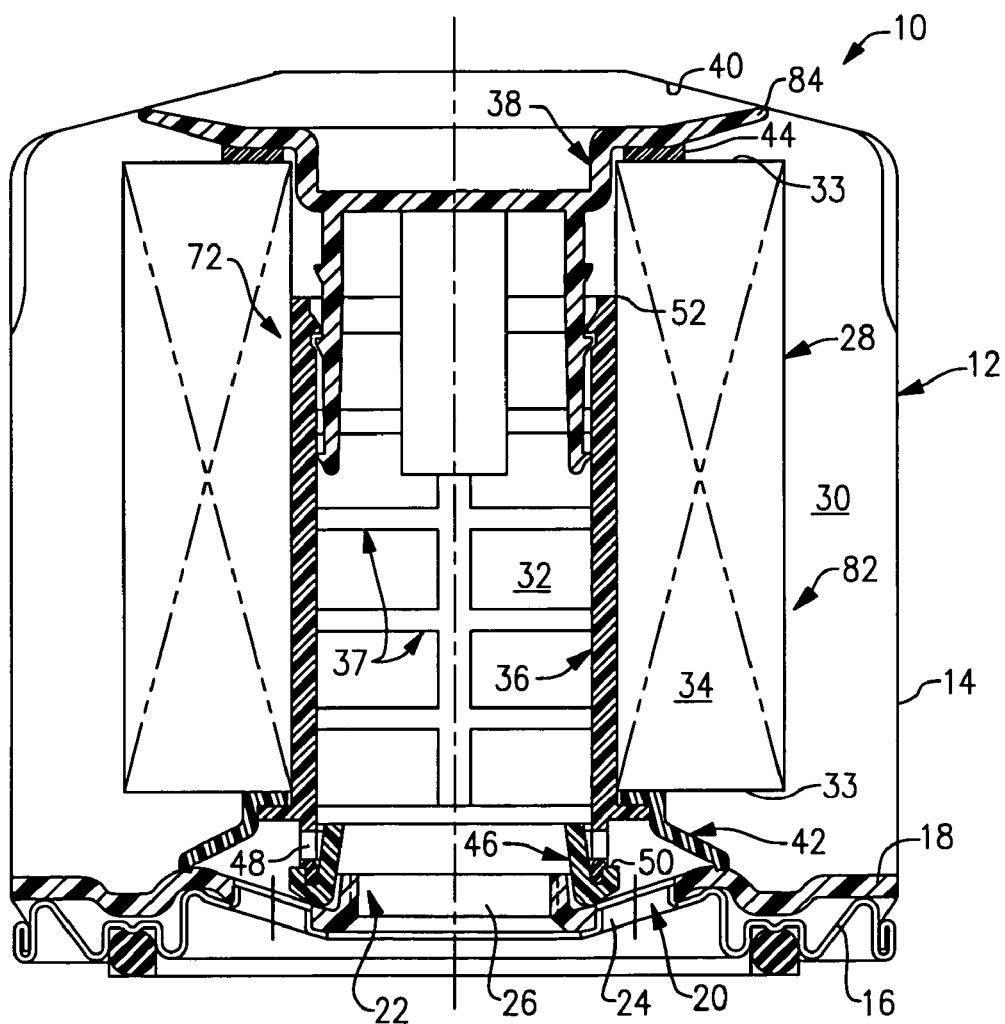
FIG. 1 is a cross-sectional view of a filter using the example adjustable cartridge assembly arrangement.

A filter 10 is shown in FIG. 1 and is representative of a typical spin-on oil filter. The filter 10 includes a housing 12 having a can 14 that provides a cavity. A retainer 16 is secured to the can 14 to retain a tapping plate 18. The tapping plate 18 includes an inlet 20 provided by multiple apertures 24 arranged circumferentially about an outlet 22. The outlet 22 is provided by a threaded hole 26 that is used to secure the filter 10 to a mounting block (not shown).

A media pack 28 is arranged within the housing 12 to filter debris from the oil. Oil flows into the housing 12 through the inlet 20 to an inlet side 30 of the media pack 28. Oil passes through the media pack 28 and exits to an outlet side 32 and flows through the outlet 22.

Figure 2:
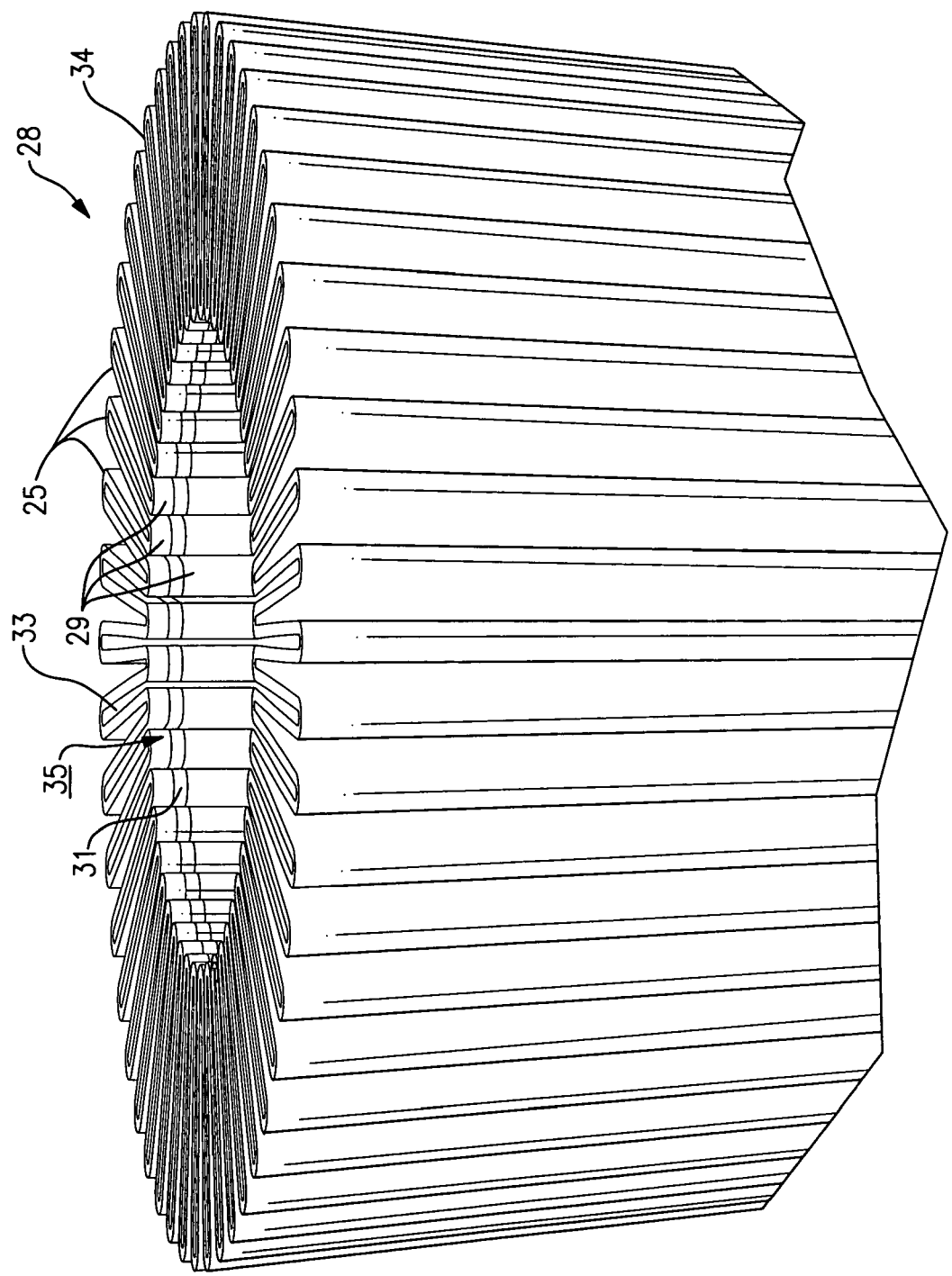
FIG. 2 is a perspective view of media pack used in the filter shown in FIG. 1.

The media pack 28 includes a filter media 34 for debris removal. The filter media 34 can be arranged between two end caps in a known manner (not shown). Alternatively, the media pack 28 may be provided using the filter media 34 arranged in a pocket-pleated arrangement, shown in FIG. 2. The filter media 34 includes pleats 25 arranged in pockets, as is known in the art. The pleats 25 are by secured beads of adhesive 31 near each of opposing ends 33, to form the pockets, so that the inner edges 29 are in close proximity to one another. The inner edges 29 provide a central opening 35 that extends between the ends 33. Using a filter media 34 of the type shown in FIG. 2 permits the elimination of end caps that are typically secured to the ends 33. Instead, flexible seals are arranged at the ends 33 and extend to the inner edges 29 to ensure that oil flows from the inlet side 30 to the outlet side 32 without bypassing the filter media 34.

Returning to FIG. 1, a center tube 36 is arranged within the central opening 35 (FIG. 2) to support the inner edges 29 so that the filter media 34 does not collapse inwardly under oil pressure. The center tube 36 is a unitary structure in the example shown and includes openings 37 that permit oil to flow through the center tube 36. A guide 38 is secured to the center tube 36 by an interlocking connection 72. The guide 38 engages a wall 40 of the housing 12 to position and load the components within the filter 10 as desired. To seal the filter media 34, a seal 44 is provided between the filter media 34 and the guide 38. An anti-drainback valve 42 is arranged between the other end 33 and the center tube 36 to provide a seal. A relief valve 46 is supported by a first end 50 of the center tube 36 while an opposing second end 52 of the center tube provides interlocking features for the interlocking connection 72, in the example shown. The anti-drainback valve 42, seal 44 and relief valve 46 are constructed from suitable materials, such as elastomers, to provide an adequate seal between the adjacent components.

Figure 3:
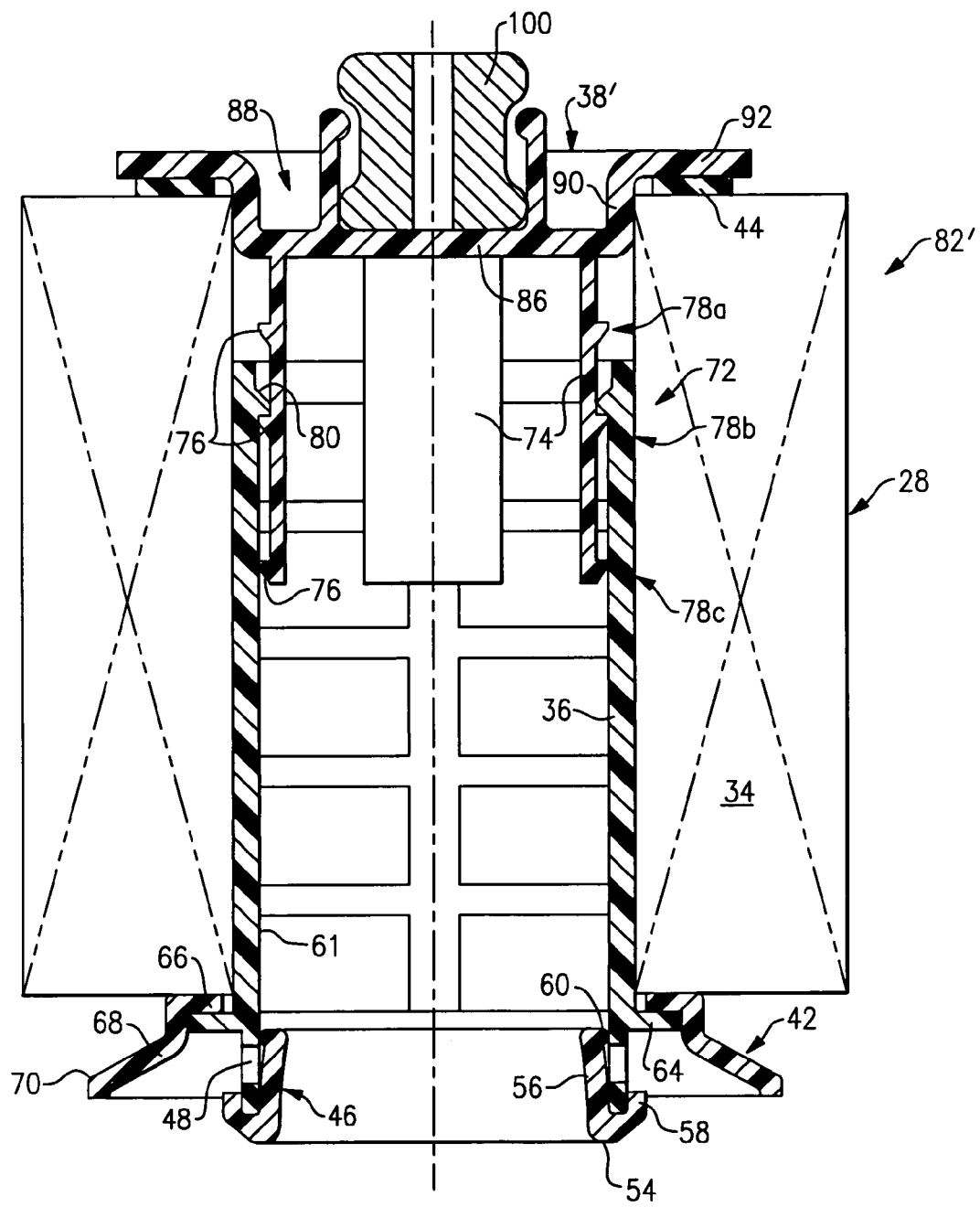
FIG. 3 is a cross-sectional view of another filter cartridge assembly with an alternative guide.

Referring to FIG. 3, the relief valve 46 includes a base 54 from which outer and inner legs 56 and 58 extend. A groove is arranged between the outer and inner legs 56 and 58 to provide a J-shaped cross-section. The inner leg 58 includes a lip 60 that engages an inner surface 61 of the center tube 36. The inner leg 58 blocks openings 48 in the center tube 36 when the relief valve 46 is in the closed position, which is shown in FIGS. 1 and 3.

The center tube 36 includes a seat 64 that extends radially outward from an axial body of the center tube 36. The anti-drainback valve 42 includes an annular flange 66 that is supported on the seat 64 and acts as a seal between the center tube 36 and the end 33 (FIG. 1). An intermediate portion 68 extends radially outward and toward the tapping plate 18 to an annular lip 70 that is in sealing engagement with the tapping plate 18 when the anti-drainback valve 42 is in a closed position, which is shown in FIG. 1.

The media pack 28, center tube 36, guide 38, seal 44 and anti-drainback valve 42 provide a filter cartridge assembly 82.

In the example filter cartridge assembly 82 shown in FIG. 1, the guide 38 includes multiple flexible tabs 84 that extend radially outwardly and upward to engage the wall 40 for ensuring that the filter cartridge assembly 82 is properly seated within the housing 12. The guide 38', shown in FIG. 3, uses a grommet 100 instead of the flexible tabs 84 to bias the filter cartridge assembly 82' within the housing.

Referring to FIG. 3, the guide 38' includes a base 86 providing a recess 88 relative to an annular seat 92 that surrounds the base 86. An inner annular shoulder 90 interconnects the base 86 and seat 92 to radially locate the end 33. Flexible arms 74 extend downwardly from the base 86 into the central opening 35 to provide an interlocking feature that cooperates with the center tube 36. The arm 74 include multiple tapered barbs 76 that are axially spaced along the arm 74 to provide first, second and third assembly heights 78a-78c. Four arms 74 are provided on the example guide 38. The center tube 36 includes a tapered barb 80, which can be a continuous annular barb or several discrete barbs, on its inner surface 61 to provide an interlocking feature that cooperates with the guide 38'. The barbs 76 and 80 cooperate with one another to provide an interlocking connection 72 at a desired assembled height position. While barbs are shown in the example, other interlocking features may be provided. Moreover, the multiple, axially spaced barbs can be provided on the center tube 36 instead of or in addition to the multiple barbs 76 on each arm 74.

Figure 4C:
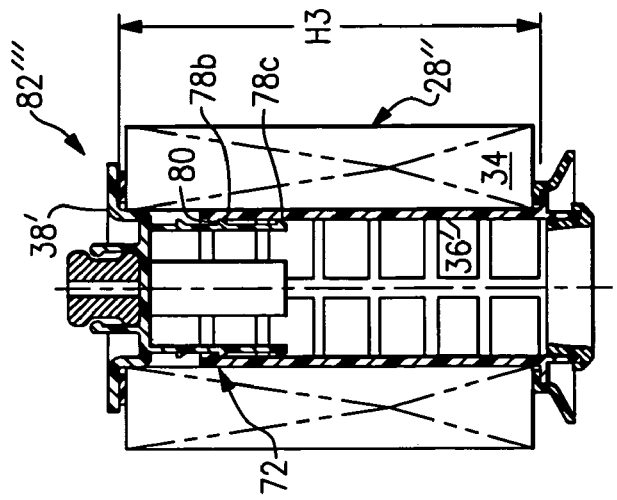
FIG. 4C is a cross-sectional view of a filter cartridge assembly shown in FIG. 4A with a taller media pack and an alternate center tube illustrating a third assembled height.
Figure 4B:
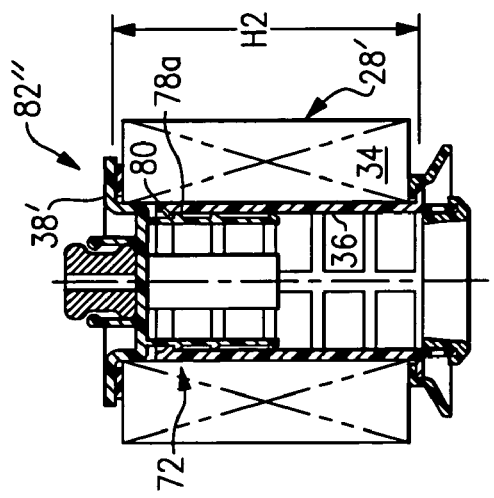
FIG. 4B is a cross-sectional view of the filter cartridge assembly shown in FIG. 4A with a shorter media pack illustrating a second assembled height.
Figure 4A:
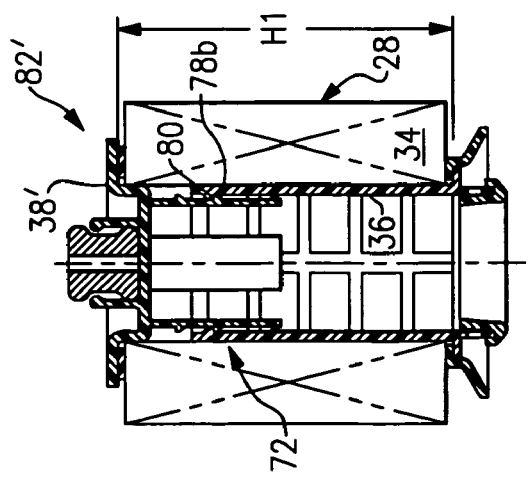
FIG. 4A is a cross-sectional view of the filter cartridge assembly shown in FIG. 3 illustrating a first assembled height.

Referring to FIGS. 4A-4C, the disclosed arrangement illustrates the flexibility in accommodating media packs 28 of differing heights with a fewer number of components. FIG. 4A corresponds to the filter cartridge assembly 82' shown in FIG. 3. The barb 76 corresponding to the second assembly height 78b is shown interlocked with the barb 80 to provide an assembled height position H1. A shorter media pack 28' is shown in FIG. 4B. The barb 76 corresponding to a first assembly height 78a is shown interlocking with the barb 80 to provide an assembled height H2. Referring to FIG. 4C, the barb 76 corresponding to the second assembly height 78b is shown interlocking with the barb 80 on a center tube 36' that is longer than the center tube 36 shown in FIGS. 4A and 4B to provide an assembled height position H3. Alternatively, the barb corresponding with a third assembly height 78c could interlock with the barb 80 of the center tube 36 to achieve the assembled height H3. The filter cartridge assembly 82''' accommodates a longer media pack 28'' than used in the filter cartridge assemblies 82' and 82''.

The filter 10 is relatively easy to assemble compared to prior art filter arrangements. First, the anti-drainback valve 42 is installed onto the center tube 36 so that the annular flange 66 is supported on the seat 64. Alternatively, the anti-drainback valve 42 can be glued or over-molded onto the center tube 36. The second end 52 of the center tube 36 is inserted into the central opening 35 of the media pack 28. The seal 44 is installed onto the guide 38. The seal 44 may also be glued to the guide 38 or over-molded onto it. The guide 38 is secured to the center tube 36 using the interlocking connection 72. The center tube 36 and guide 38 are loaded so that the anti-drainback valve 42 and seal 44 are in good sealing engagement with the opposing ends 33 of the media pack 28.

The relief valve 46 is installed onto the filter cartridge assembly 82 so that the first end 50 is seated in the groove of the relief valve 46. The filter cartridge assembly 82 is then inserted into the cavity provided by the can 14. The tapping plate 18 is secured to the can 14 using the retainer 16, as is well known in the art. The base 54 of the relief valve 46 seals against the tapping plate 18.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A filter comprising:
    a media pack having a central opening extending between opposing ends of the media pack;
    a first support member extending through the central opening and supporting one of the opposing ends;
    a second support member secured to the first support member and supporting the other of the opposing ends; and
    wherein the first and second support members include interlocking features cooperating with one another to provide a plurality of assembled height positions for accommodating media pack of differing heights.

2. The filter according to claim 1, wherein the first support member is a center tube including multiple openings permitting fluid flow between inlet and outlet sides of the center tube.

3. The filter according to claim 2, wherein the second support member is a filter cartridge assembly guide.

4. The filter according to claim 2, wherein the center tube includes an axially extending body and a seat integrally formed with the body and extending radially outward therefrom, the media pack supported on the seat.

5. The filter according to claim 1, wherein seals are arranged between the first and second support members and the media pack.

6. The filter according to claim 1, including a housing having a can with open and closed ends, and a tapping plate secured to the can at the open end enclosing a cavity of the can with the media pack arranged within the cavity, and the second support member is a guide engaging the closed end.

7. A filter cartridge assembly comprising:
    a plurality of media packs each of which has opposing ends providing different heights;
    a first support member supporting one of the opposing ends;
    a plurality of second support members, one of the plurality of second support members selected to accommodate the height of one of the plurality of media packs, the one of the plurality of second support members cooperating with the first support member and supporting the other of the opposing ends;
    wherein the first and second members include interlocking features engaging one another to provide an interlocking connection securing the first and second support members to one another; and
    wherein one of the first and second support members includes a flexible arm having multiple barbs cooperating with an interlocking feature on the other of the first and second support members, the barbs providing a plurality of height positions.

8. The filter cartridge assembly according to claim 7, wherein the barbs are axially spaced from one another to provide the plurality of height positions.

9. The filter cartridge assembly according to claim 7, wherein one of the first and support members is a center tube and the other of the first and second support members is a guide having a biasing member for cooperating with a filter housing.

10. The filter cartridge assembly according to claim 9, wherein the center tube includes an axially extending body having a plurality of openings, and a seat extending radially outward from the axially extending body to support the media pack.

11. A filter cartridge assembly comprising:
- a plurality of media packs each of which has opposing ends providing different heights;
- a first support member supporting one of the opposing ends;
- a plurality of second support members, one of the plurality of second support members selected to accommodate the height of one of the plurality of media packs, the one of the plurality of second support members cooperating with the first support member and supporting the other of the opposing ends;
- wherein the first and second members include interlocking features engaging one another to provide an interlocking connection securing the first and second support members to one another;
- wherein one of the first and second support members is a center tube and the other of the first and second support members is a guide having a biasing member for cooperating with a filter housing;
- wherein the center tube includes an axially extending body having a plurality of openings, and a seat extending radially outward from the axially extending body to support the media pack; and
- wherein the media packs include a filter media, and first and second seals are respectively arranged between the filter media and the center tube and the guide.

12. The filter cartridge assembly according to claim 11, wherein one of the first and second seals is an anti-drainback valve.

13. A method of assembling a filter comprising the steps of:
a) providing a media pack having a central opening;
b) inserting a first support member into the central opening with the first support member supporting one end of the media pack;
c) securing a second support member to the first support member to support another end of the media pack opposite the one end;
wherein step c) includes engaging first and second interlocking features with one another to provide a desired assembled height;
including deflecting a flexible arm when performing step c); and
wherein one of the first and second members includes a plurality of interlocking features axially spaced relative to one another to provide multiple assembly heights.

14. A method of assembling a filter comprising the steps of:
a) providing a media pack having a central opening;
b) inserting a first support member into the central opening with the first support member supporting one end of the media pack;
c) securing a second support member to the first support member to support another end of the media pack opposite the one end;
wherein step c) includes engaging first and second interlocking features with one another to provide a desired assembled height;
including deflecting a flexible arm when performing step c); and
including step b1) installing a first seal onto the first support member, and step b2) providing a second seal on the second support member, the first and second seals engaging the media pack subsequent to performing step c).

* * * * *